US010183335B2

(12) United States Patent
Hara et al.

(10) Patent No.: US 10,183,335 B2
(45) Date of Patent: Jan. 22, 2019

(54) CHUCK APPARATUS

(71) Applicant: SMC Corporation, Chiyoda-ku (JP)

(72) Inventors: Koji Hara, Tsukubamirai (JP); Koichiro Ishibashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 71 days.

(21) Appl. No.: 15/173,872

(22) Filed: Jun. 6, 2016

(65) Prior Publication Data

US 2017/0001245 A1    Jan. 5, 2017

(30) Foreign Application Priority Data

Jun. 30, 2015  (JP) ................................. 2015-130902

(51) Int. Cl.
*B23B 31/175*     (2006.01)
*B23B 31/00*      (2006.01)
(Continued)

(52) U.S. Cl.
CPC ...... *B23B 31/16216* (2013.01); *B23B 31/001* (2013.01); *B23Q 11/08* (2013.01); (Continued)

(58) Field of Classification Search
CPC . B23B 31/001; B23B 31/12; B23B 31/16195; B23B 31/16287;
(Continued)

(56) References Cited

U.S. PATENT DOCUMENTS

| 2,538,521 | A | * | 1/1951 | Huntting | B23B 31/001 |
| | | | | | 279/116 |
| 2,903,268 | A | * | 9/1959 | Buck | B23B 31/001 |
| | | | | | 279/123 |

(Continued)

FOREIGN PATENT DOCUMENTS

| DE | 2003621 A1 * | 8/1971 | ........... B23B 31/001 |
| JP | 3846226 B2 * | 11/2006 | ........... B23B 31/001 |

(Continued)

OTHER PUBLICATIONS

Machine translation, Japan patent docuement, JP3846226 (equivalent to JP2002346813), Haba, K., Dec. 2002.*

(Continued)

*Primary Examiner* — Eric A Gates
*Assistant Examiner* — Chwen-Wei Su
(74) *Attorney, Agent, or Firm* — Oblon, McClelland, Maier & Neustadt, L.L.P.

(57) ABSTRACT

A chuck apparatus grips a workpiece by a gripping section having a pair of chuck members. The chuck apparatus is equipped with a cover member and pressing members. The cover member includes insertion holes through which fingers of the chuck members are inserted, and seal members that surround the insertion holes and abut against the fingers. The cover member is attached to a body so as to cover base portions of the chuck members, and is elastically deformable so as to follow displacement of the chuck members. The pressing members press the seal members against the fingers.

6 Claims, 5 Drawing Sheets

(51) Int. Cl.
    *B23Q 11/08* (2006.01)
    *B25J 19/00* (2006.01)
    *B25J 15/02* (2006.01)
(52) U.S. Cl.
    CPC ....... *B25J 15/0273* (2013.01); *B25J 19/0075* (2013.01); *Y10T 279/1291* (2015.01); *Y10T 279/1961* (2015.01); *Y10T 279/3493* (2015.01)
(58) Field of Classification Search
    CPC .............. B23B 31/16216; B23Q 11/08; B23Q 11/0816; Y10T 279/1291; Y10T 279/17384; Y10T 279/1961; Y10T 279/19; Y10T 279/1953; Y10T 279/3493
    See application file for complete search history.

(56) References Cited

U.S. PATENT DOCUMENTS

| | | | | |
|---|---|---|---|---|
| 3,251,606 A * | 5/1966 | Crane | ................... | B23B 31/001 279/119 |
| 3,963,249 A * | 6/1976 | Fink | ........................ | B23B 31/00 279/110 |
| 6,073,940 A * | 6/2000 | Tabachenko | .......... | B23B 31/001 279/110 |
| 6,588,191 B2 * | 7/2003 | Berndt | ................. | A01B 29/045 404/124 |
| 7,303,195 B2 * | 12/2007 | Nie | ....................... | B23B 31/103 269/309 |
| 9,592,579 B2 * | 3/2017 | Hediger | ................. | B23B 31/001 |
| 2008/0018060 A1 * | 1/2008 | Ishii | ...................... | B23B 31/001 279/4.06 |
| 2008/0169619 A1 | 7/2008 | Minbuta et al. | | |

FOREIGN PATENT DOCUMENTS

JP  2008-173692  7/2008
WO  WO 2014067497 A2 *  5/2014  ......... B23Q 11/0071

OTHER PUBLICATIONS

Machine translation, WIPO publication, WO 2014067497, Bayona Salazasr, V.M., Aug. 2014.*

* cited by examiner

CHUCK APPARATUS

CROSS-REFERENCE TO RELATED APPLICATION

This application is based upon and claims the benefit of priority from Japanese Patent Application No. 2015-130902 filed on Jun. 30, 2015, the contents of which are incorporated herein by reference.

BACKGROUND OF THE INVENTION

Field of the Invention

The present invention relates to a chuck apparatus that grips a workpiece by a gripping section that can be opened and closed.

Description of the Related Art

Heretofore, there has been known a chuck apparatus, for example, which is mounted on a distal end of a shaft or the like of a machine tool. In such a chuck apparatus, opening and closing operations of a gripping section constituted from a pair of chuck members are carried out under the supply of a pressure fluid or an electrical signal, whereby a workpiece, such as various parts or the like, is gripped (see, for example, Japanese Laid-Open Patent Publication No. 2008-173692). In this type of chuck apparatus, the chuck members are disposed movably with respect to a body of the chuck apparatus.

SUMMARY OF THE INVENTION

Incidentally, for the purpose of suitably maintaining smoothness of movement of the chuck members, it may be considered to provide a cover member (protective cover) to prevent dust or moisture or the like from entering into sliding portions between the body and the chuck members, and into a mechanism for moving the chuck members. In this case, it is desirable for the cover member to prevent the ingress of dust or moisture or the like from between the chuck members and the cover member, without interfering with the movement of the chuck members.

The present invention has been devised taking into consideration the aforementioned problem, and has the object of providing a chuck apparatus, which is equipped with a structure that can suitably prevent entry of dust or moisture or the like by a cover member.

To achieve the aforementioned object, the present invention is characterized by a chuck apparatus including a body and a gripping section configured to be opened and closed, the gripping section including a pair of chuck members supported on the body, wherein at least one of the chuck members is movable with respect to the body, and a workpiece is gripped by the gripping section, wherein the chuck apparatus further includes a cover member including an insertion hole therein through which a finger of the one of the chuck members is inserted, and a seal member configured to surround the insertion hole and abut against the finger, wherein the cover member is attached to the body so as to cover base portions of the chuck members, and is elastically deformable so as to follow displacement of the one of the chuck members, and a pressing member configured to press the seal member against the finger.

According to the chuck apparatus which is constructed in the foregoing manner, the seal member of the cover member is pressed against the finger by the pressing member. Therefore, when the chuck member is displaced for opening and closing the gripping section, the occurrence of a gap between the seal member and the finger can be prevented. Thus, a good sealing property is obtained, and a dust-proof and waterproof function of the cover member can suitably be exhibited.

In the above-described chuck apparatus, the pressing member may be formed in an annular shape surrounding the finger, and the seal member may be sandwiched in an elastically compressed state between the pressing member and the finger.

When constructed in this manner, since the seal member is kept in intimate contact with the finger under a "crushing" action applied with respect to the seal member by the annular shaped pressing member, a more favorable sealing property can be obtained.

In the above-described chuck apparatus, the pressing member may include a plurality of pressing sections arranged alongside one another in a circumferential direction, and the seal member may be fitted between the plurality of pressing sections and the finger.

In accordance with this configuration, in an assembly process for the chuck apparatus, since the plural pressing sections are slightly deformed elastically when the seal member of the cover member is fitted in between the pressing member and the finger, the assembly thereof is facilitated.

In the above-described chuck apparatus, the pressing member may be disposed on an inner side of the cover member.

In accordance with this configuration, the pressing member can be disposed in a small space, and it is possible to reliably prevent falling off of the pressing member.

In the above-described chuck apparatus, the pressing member may be disposed on an outer side of the cover member.

In accordance with this configuration, when the pressing member is assembled, the pressing member can easily be mounted from the outer side of the cover member.

In the above-described chuck apparatus, among the pair of chuck members, another chuck member also is movable with respect to the body, the cover member further includes another insertion hole and another seal member formed corresponding to the other chuck member, and another pressing member is further provided corresponding to the other chuck member.

In accordance with this structure, in a chuck apparatus in which a workpiece is gripped by movement of both of the pair of chuck members, the occurrence of gaps between the seal members and the fingers is effectively prevented, and a dust-proof and waterproof function of the cover member can be suitably exhibited.

According to the chuck apparatus of the present invention, entry of dust or moisture or the like can suitably be prevented by the cover member.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Below, preferred embodiments of a chuck apparatus according to the present invention will be described with reference to the accompanying drawings.

Figure 1:
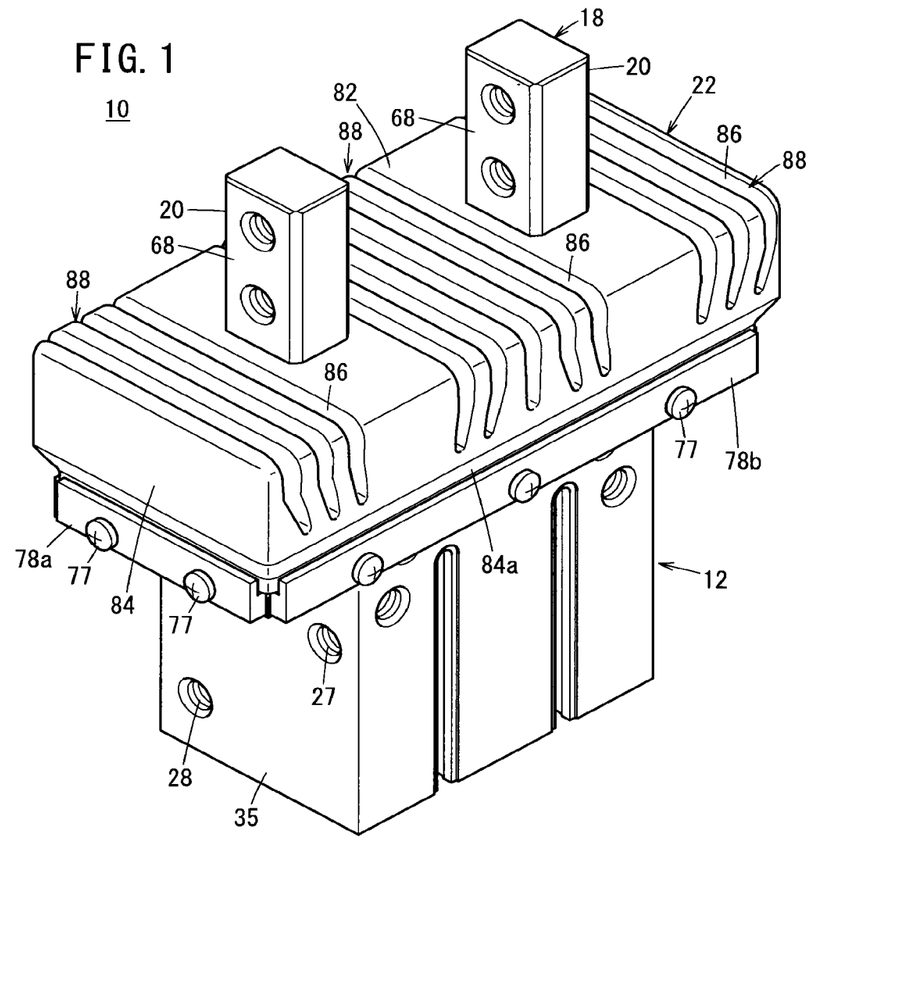
FIG. 1 is a perspective view of a chuck apparatus according to an embodiment of the present invention.
Figure 2:
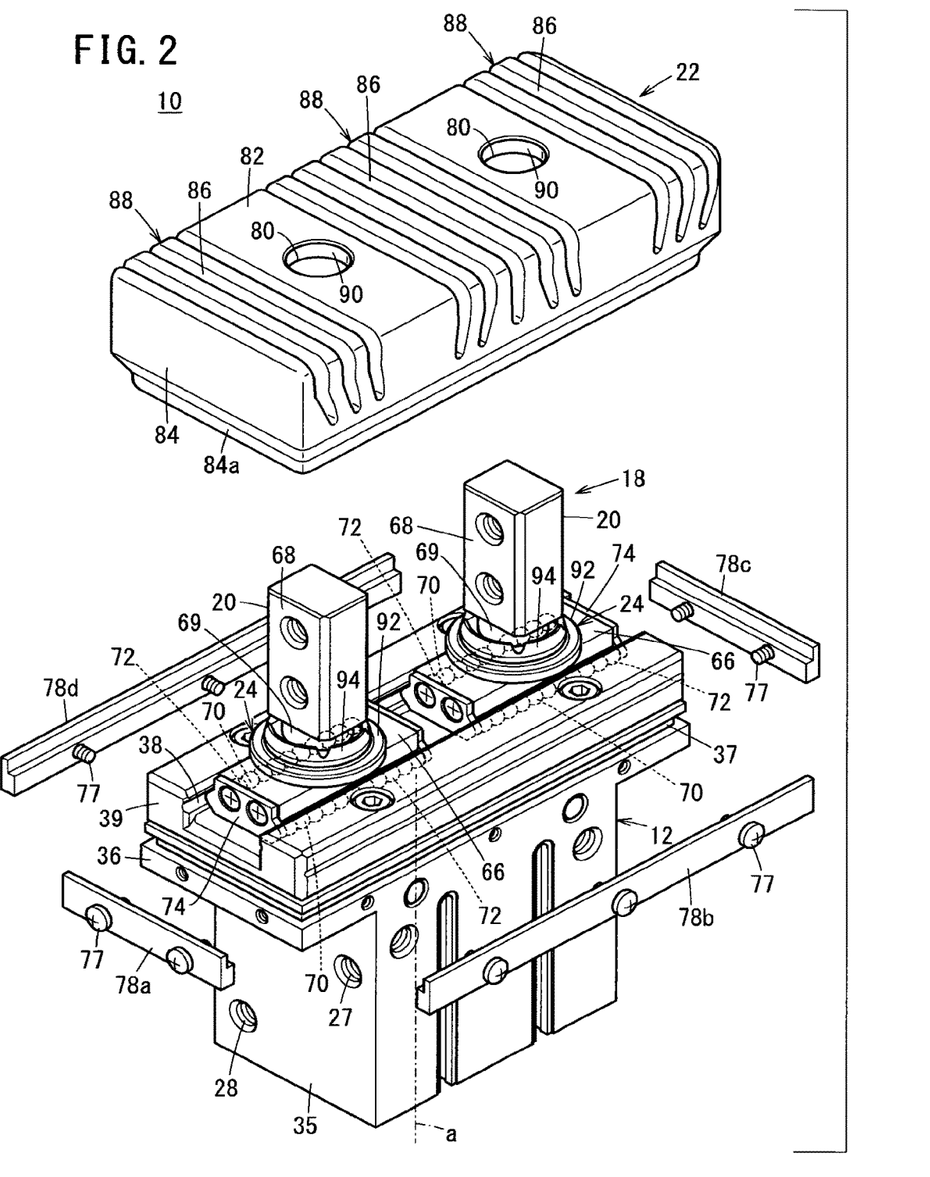
FIG. 2 is an exploded perspective view of the chuck apparatus shown in FIG. 1.
Figure 3:
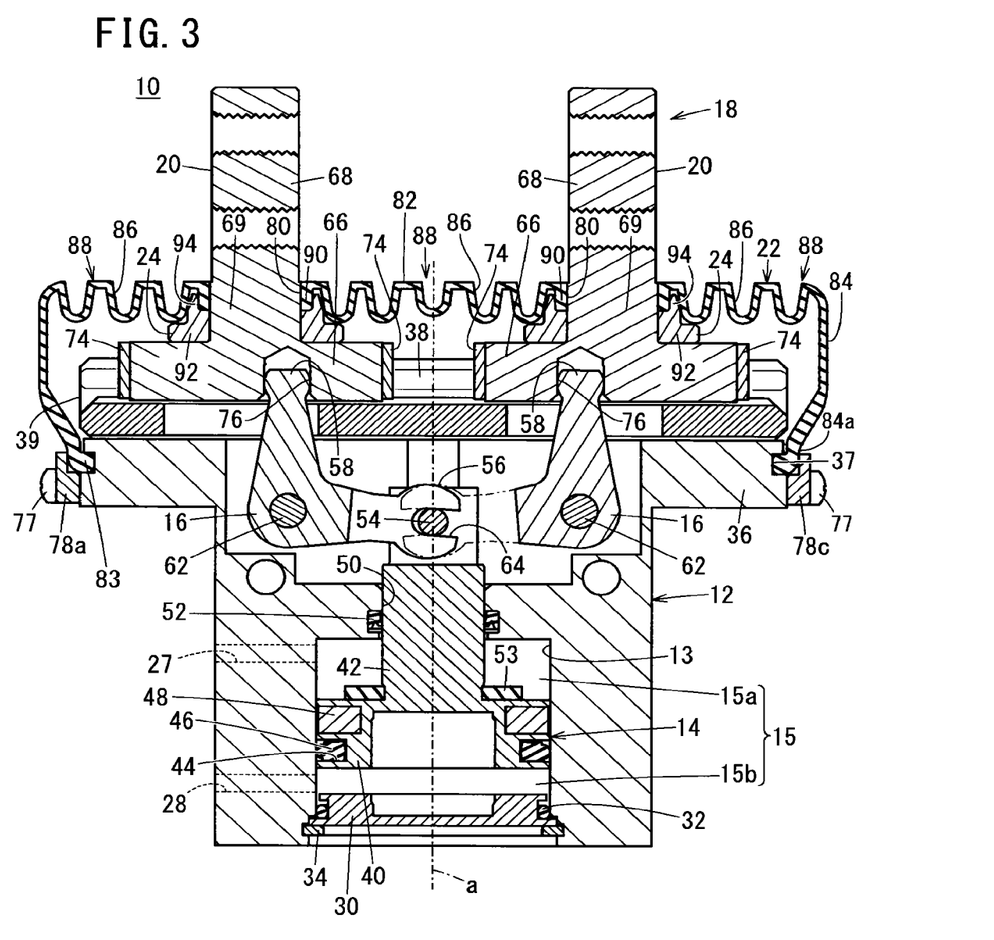
FIG. 3 is a cross-sectional view of the chuck apparatus shown in FIG. 1.

As shown in FIGS. 1 through 3, the chuck apparatus 10 is equipped with a body 12 in which a cylinder hole 13 is formed, a piston 14 arranged in the interior of the body 12 displaceably along the direction of an axis a (hereinafter referred to as an "axial direction") of the cylinder hole 13, and a gripping section 18, which can perform opening and closing operations, and having a pair of chuck members 20 that are linked to the piston 14 through levers 16. Furthermore, the chuck members 20 are equipped with a cover member 22 that is attached to the body 12 and covers a base part side of the gripping section 18, and pressing members 24 for ensuring sealability between the chuck members 20 and the cover member 22.

As shown in FIG. 3, a first port 27 and a second port 28, which perform supply and discharge of a pressure fluid (e.g., compressed air) with respect to the interior of the cylinder hole 13, open on a side surface of the body 12.

In the cylinder hole 13, a cap 30 is fitted in an open end side thereof, and by the cap 30 closing and sealing the cylinder hole 13, a pressure chamber 15 is formed in the interior of the body 12. An annular seal member 32, which is installed on an outer circumferential surface of the cap 30, abuts against an inner circumferential surface of the cylinder hole 13, whereby airtightness is maintained inside the cylinder hole 13. Further, a locking ring 34 is installed on the inner circumferential surface of the cylinder hole 13, whereby the cap 30 is retained with respect to the cylinder hole 13.

The first port 27 and the second port 28 are disposed with a predetermined distance therebetween in the axial direction of the body 12. The first port 27 communicates with a space on one end surface side of the piston 14, whereas the second port 28 communicates with another space between the cap 30 and the other end surface of the piston 14. The first port 27 and the second port 28 are connected to a non-illustrated pressure fluid supply source.

A base section 36 is disposed on an end portion of the body 12 on an opposite side from the side on which the cap 30 is disposed, and a supporting member 39 that movably supports the gripping section 18 is fixed to the base section 36. Rail grooves 38, in which the pair of chuck members 20 of the gripping section 18 are guided displaceably, are formed in the supporting member 39. The rail grooves 38 extend along a direction substantially perpendicular to the axis a of the cylinder hole 13.

With the body 12 shown in the illustrated example, the base section 36 is formed integrally with a cylinder section 35, which is a portion in which the piston 14 is accommodated. However, in a modification thereof, the cylinder section 35 and the base section 36 may be formed as separate components.

The piston 14 includes a piston main body portion 40, which partitions the pressure chamber 15 of the body 12 into a first chamber 15a and a second chamber 15b, and a rod portion 42, which is reduced in diameter with respect to the piston main body portion 40, and projects from the piston main body portion 40 toward the side of the gripping section 18.

An annular groove 44 is formed on an outer circumferential part of the piston main body portion 40, and a ring-shaped piston packing 46 is mounted in the annular groove 44. By the piston packing 46 remaining in intimate contact along the entire circumference of the inner circumferential surface of the cylinder hole 13, airtightness is suitably maintained between the first chamber 15a and the second chamber 15b, which are partitioned in the axial direction by the piston main body portion 40. The surface of the piston main body portion 40 on a side opposite from the gripping section 18 is arranged face-to-face with the cap 30.

Further, a magnet 48 is disposed adjacent to the piston packing 46 on the outer circumferential surface of the piston main body portion 40. By detecting magnetism from the magnet 48 using a non-illustrated position detecting sensor, the position of the piston main body portion 40 in the axial direction can be confirmed.

The rod portion 42 is inserted through a rod hole 50, which is reduced in diameter with respect to the cylinder hole 13. A rod packing 52 provided on an inner circumferential surface of the rod hole 50 abuts against an outer circumferential surface of the rod portion 42. A damper 53, which is made, for example, from a resilient material such as rubber or the like, is mounted on a base part of the rod portion 42. Owing thereto, shocks are buffered when the piston 14 is displaced toward the gripping section 18 and comes into abutment against a wall that forms an end portion of the cylinder hole 13.

A pair of levers 16 are swingably engaged with the rod portion 42 through a pin 54 that is provided on the rod portion 42. Each of the respective levers 16 is formed in a substantially L-shape, and includes a first end part 56 that engages with the rod portion 42, and a second end part 58 that engages with the chuck member 20. Further, the levers 16, substantially in center portions thereof, are pivotally supported rotatably on the body 12 through a pair of link pins 62 provided on the body 12. The first end part 56 of each of the levers 16 has a cutout portion 64 formed therein, and the cutout portion 64 is engaged with the pin 54 that is disposed on the end of the rod portion 42.

Further, each of the levers 16 is formed to gradually narrow from a portion thereof that is supported by the link pin 62 toward the second end part 58, and the second end part 58 is supported pivotally in a later-described base portion 66 of the chuck member 20. Owing thereto, by displacement of the rod portion 42 in the axial direction, the pair of levers 16 are rotatably displaced via the link pins 62 in such a manner that the second end parts 58 thereof approach toward and separate away from one another mutually.

The gripping section 18 includes the pair of chuck members 20, which are capable of moving with respect to the body 12. In the present embodiment, the chuck members 20 are supported on the body 12 so as to be displaceable along the rail grooves 38 (in directions perpendicular to the axis a). More specifically, each of the chuck members 20 includes a block-shaped base portion 66 that is guided in the rail grooves 38, and a finger 68 that projects out from the base portion 66 on a side thereof opposite to the body 12.

Grooves 70 that extend along the direction of movement of the chuck members 20 are formed in respective side surfaces of each of the base portions 66, and plural balls 72 are arranged along a straight line in each of the grooves 70.

The balls 72 are retained inside the grooves by end plates 74, which are mounted on both end surfaces (end surfaces on both sides in the direction of movement of the chuck members 20) of each of the base portions 66. Further, the balls 72 are retained between the grooves 70 that are formed in the base portions 66 and the rail grooves 38 that are formed in the base section 36. Due to such a structure, resistance to displacement is reduced when the chuck members 20 are displaced along the rail grooves 38, and the chuck members 20 can be displaced smoothly in the directions of movement thereof.

In each of the chuck members 20, on a surface of the base portion 66 on the side of the lever 16, an engagement groove 76 is provided, with which the second end part 58 of the lever 16 engages in a fitted condition. The second end parts 58 of the levers 16 are engaged rotatably inside the engagement grooves 76.

The base portions 66 are covered by the cover member 22. More specifically, the base portions 66 are accommodated in the interior of the cover member 22. On the other hand, root parts 69 of the fingers 68 penetrate through the cover member 22, and free end sides of the fingers 68, which serve to grip the workpiece, are exposed on the outer side of the cover member 22. In the case of the present embodiment, the root parts 69 of the fingers 68 that penetrate through the cover member 22 have circular shapes in cross section.

The entire cover member 22 is made up from a resilient material such as a rubber material or an elastomeric material, and is attached to the body 12 in a state of covering the base portions 66 of the pair of chuck members 20. In the present embodiment, the cover member 22 has a substantially rectangular shape as viewed in plan. More specifically, the cover member 22 includes a main wall 82, in which two insertion holes 80 are formed through which the fingers 68 of the chuck members 20 are inserted, and a side wall 84, which extends toward the body 12 from the peripheral edge of the main wall 82, and is fixed in an airtight state to the base section 36 of the body 12.

On the main wall 82, a plurality of grooves 86 are formed with intervals therebetween, so as to enable the cover member 22 to easily be deformed elastically along the directions of movement of the chuck members 20. Due to the plurality of grooves 86, bellows sections 88 having corrugated shapes in cross-section are formed in the cover member 22. The bellows sections 88 are disposed respectively at a portion between the two insertion holes 80 in the cover member 22, and at portions on outer sides of the two insertion holes 80. Since the cover member 22 is constituted in this manner, the cover member 22 is capable of being deformed elastically so as to follow the displacement of the chuck members 20 when the chuck members 20 are moved in order to open and close the gripping section 18.

The two insertion holes 80 that are provided in the cover member 22 are portions through which the fingers 68 (root parts 69) are inserted, and in the case of the present embodiment, are provided in the form of circular holes commensurate with the shapes of the root parts 69 of the fingers 68. In the cover member 22, portions that surround the respective two insertion holes 80 are constituted in the form of annular seal members 90 that abut against the outer circumferential surfaces of the respective fingers 68. Inner circumferential surfaces of the seal members 90 are placed in abutment against the outer circumferential surfaces (of the root parts 69) of the fingers 68 around the entire circumference thereof.

A protrusion 83, which projects inwardly and circles along the side wall 84, is formed on an end 84a of the side wall 84 on a side opposite from the main wall 82. The protrusion 83 is fitted into a groove 37 that is formed on the outer circumferential surface of the base section 36. Further, the end 84a of the side wall 84 is pressed against and attached to the base section 36 by fixing plates 78a to 78d, which are fixed to the base section 36 by screws 77. As a result, the end 84a is fixed in an airtight manner with respect to the base section 36.

The pressing members 24 press the seal members 90 of the cover member 22 against the fingers 68 of the chuck members 20. Since the pressing members 24 do not undergo substantial deformation (elastic stretching) even when the chuck members 20 are displaced with respect to the body 12 for opening and closing the gripping section 18, the pressing members 24 are capable of pressing the seal members 90 against the fingers 68 around the entire periphery thereof. In order to realize such a function, the pressing members 24 preferably are constituted from a rigid material (a hard resin, a metal material, or the like).

More specifically, the pressing members 24 are formed in annular shapes surrounding the fingers 68, and the seal members 90 are sandwiched in an elastically compressed state between the pressing members 24 and the fingers 68.

As shown in FIGS. 2 and 3, in the case of the present embodiment, each of the pressing members 24 includes an annular shaped ring member 92, and plural pressing sections 94, which project out from the ring member 92 and are arranged side-by-side at intervals therebetween in the circumferential direction. Each of the pressing sections 94 is formed in an arcuate shape. Each of the seal members 90 is fitted in a state of being press-fitted between the finger 68 and the plurality of pressing sections 94. More specifically, the seal member 90 is pressed toward the finger 68 by the plurality of pressing sections 94, and by such a pressing force, the seal member 90 is placed in a state (crushed state) of being compressed elastically in radial directions. Consequently, the inner circumferential surfaces of the seal members 90 are placed in abutment against the outer circumferential surfaces (of the root parts 69) of the fingers 68 around the entire circumference thereof.

Further, as shown in FIG. 3, in the present embodiment, the seal members 90 project out from the main wall 82 toward the inner side of the cover member 22 (the side of the base portions 66 of the chuck members 20), and at the inner side of the cover member 22, the pressing members 24 are arranged so as to surround the seal members 90. Further, the pressing members 24 are arranged between the base portions 66 of the chuck members 20 and the main wall 82 of the cover member 22.

Next, operations and advantageous effects of the chuck apparatus 10 will be explained.

When a pressure fluid is supplied from a non-illustrated pressure fluid supply source to the first chamber 15a of the body 12 through the first port 27, the piston 14 is displaced in a direction away from the gripping section 18. Accompanying the displacement of the piston 14, the first end parts 56 of the pair of levers 16, which are engaged with the rod portion 42 of the piston 14, are pulled toward the side of the piston main body portion 40. In this case, the second port 28 is in a state of being open to atmosphere.

Accordingly, the pair of levers 16 are rotated respectively about the link pins 62 in directions such that the second end parts 58 thereof approach one another mutually, and the pair of chuck members 20, with which the second end parts 58 are engaged, are displaced in directions to approach each other. At this time, the cover member 22 through which the fingers 68 are inserted is deformed elastically so as to follow the displacement of the chuck members 20, whereby the seal members 90 and the pressing members 24 also are displaced together with the chuck members 20. In addition, by the pair of chuck members 20 of the gripping section 18, which are operated in the manner described above, a non-illustrated workpiece is gripped at a predetermined pressure.

On the other hand, in the case that gripping of the workpiece by the gripping section 18 is to be released, under a switching action of a non-illustrated switching valve, the pressure fluid that was supplied to the first chamber 15*a* is supplied instead to the second chamber 15*b* through the second port 28. In this case, the first port 27 is in a state of being open to atmosphere. Consequently, under a pressing action of the pressure fluid introduced to the second chamber 15*b*, the piston 14 is displaced toward the side of the gripping section 18.

In addition, accompanying the displacement of the piston 14, the pair of levers 16, which are engaged with the rod portion 42, are rotated respectively about the link pins 62 in such a manner that the second end parts 58 thereof separate away from one another mutually. Therefore, the pair of chuck members 20, which are engaged with the levers 16, are displaced in directions away from each other. At this time, the cover member 22 through which the fingers 68 are inserted is deformed elastically in following relation to the displacement of the chuck members 20, whereby the seal members 90 and the pressing members 24 also are displaced together with the chuck members 20. In addition, accompanying operation of the pair of chuck members 20 in this manner, gripping of the workpiece is released.

In this case, according to the chuck apparatus 10, which is constructed in the foregoing manner, the seal members 90 of the cover member 22 are pressed against the fingers 68 by the pressing members 24. Therefore, when the chuck members 20 are displaced for opening and closing the gripping section 18, the occurrence of gaps between the seal members 90 and the fingers 68 can be prevented. Thus, a good sealing property is obtained, and a dust-proof and waterproof function of the cover member 22 can suitably be exhibited.

For example, in this case, if the pressing members 24 were not provided in the chuck apparatus 10, when the chuck members 20 are displaced for the purpose of opening and closing the gripping section 18, due to the occurrence of elastic stretching in the seal members 90, there would be a possibility for gaps to occur between the seal members 90 and the fingers 68. This is because, in the case that the pressing members 24 are not provided, the force with which the seal members 90 abut against the fingers 68 is only the tensile force based on the elasticity of the seal members 90 themselves. In contrast thereto, in accordance with the chuck apparatus 10 that is equipped with the pressing members 24, the seal members 90 of the cover member 22 are pressed against the fingers 68 by the pressing members 24 in an elastically compressed state. Owing thereto, at the time that the chuck members 20 are displaced as well, since a state of intimate contact between the seal members 90 and the fingers 68 is maintained, the occurrence of gaps between the seal members 90 and the fingers 68 does not take place.

In particular, in the case of the present embodiment, the pressing members 24 are formed in annular shapes surrounding the fingers 68, and the seal members 90 are sandwiched in an elastically compressed state between the pressing members 24 and the fingers 68. Due to being constructed in this manner, since the seal members 90 are kept in intimate contact with the fingers 68 under a "crushing" action applied with respect to the seal members 90 by the annular shaped pressing members 24, a more favorable sealing property can be obtained.

Further, in the case of the present embodiment, the pressing members 24 each include a plurality of pressing sections 94 arranged alongside one another in a circumferential direction, and the seal members 90 are fitted between the plurality of pressing sections 94 and the fingers 68. In accordance with this configuration, in an assembly process for the chuck apparatus 10, since the plural pressing sections 94 are slightly deformed elastically when the seal members 90 of the cover member 22 are fitted in between the pressing members 24 and the fingers 68, the assembly thereof is facilitated.

Furthermore, in the case of the present embodiment, because the pressing members 24 are arranged on the inner side of the cover member 22, the pressing members 24 can be disposed in a small space, and it is possible to reliably prevent falling off of the pressing members 24.

Further, in the case of the present embodiment, both of the pair of chuck members 20 are disposed movably with respect to the body 12, and the pressing members 24 are mounted on the respective seal members 90. Therefore, in the chuck apparatus 10 in which a workpiece is gripped by movement of both of the pair of chuck members 20, the occurrence of gaps between the seal members 90 and the fingers 68 is effectively prevented, and a dust-proof and waterproof function of the cover member 22 can be suitably exhibited.

Figure 4:
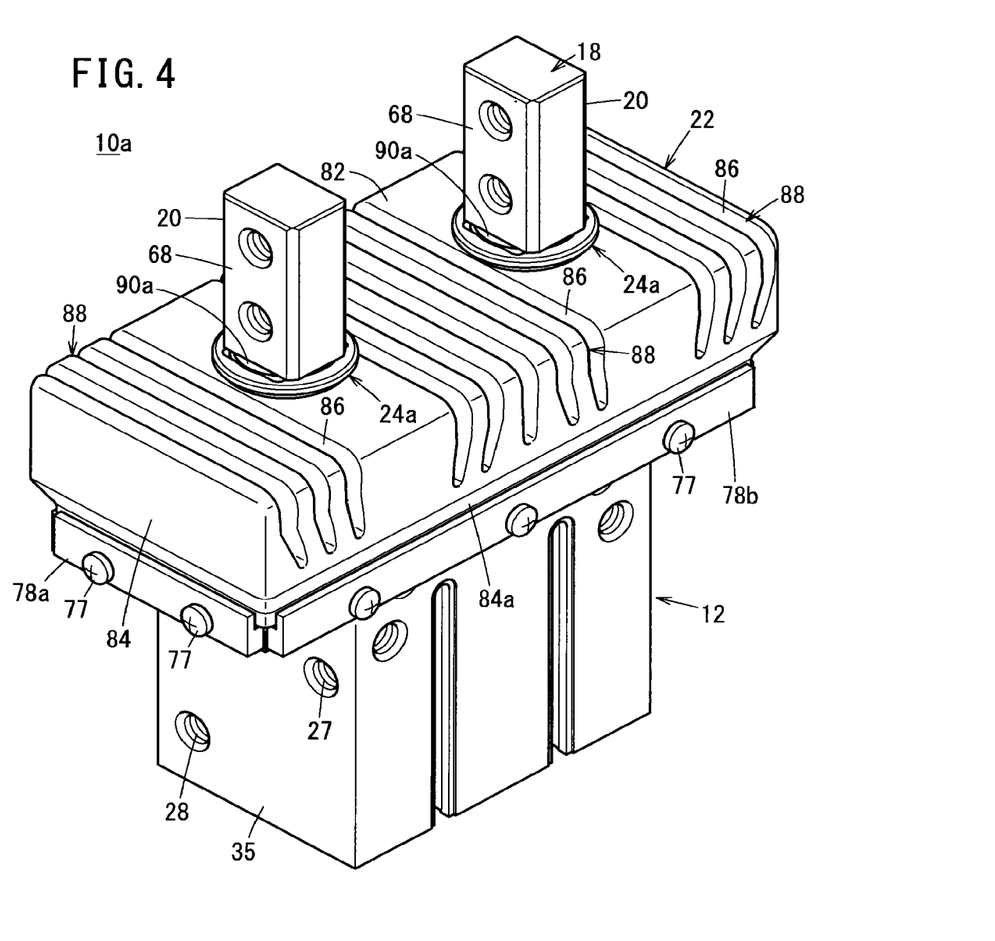
FIG. 4 is a perspective view of a chuck apparatus according to a modification.
Figure 5:
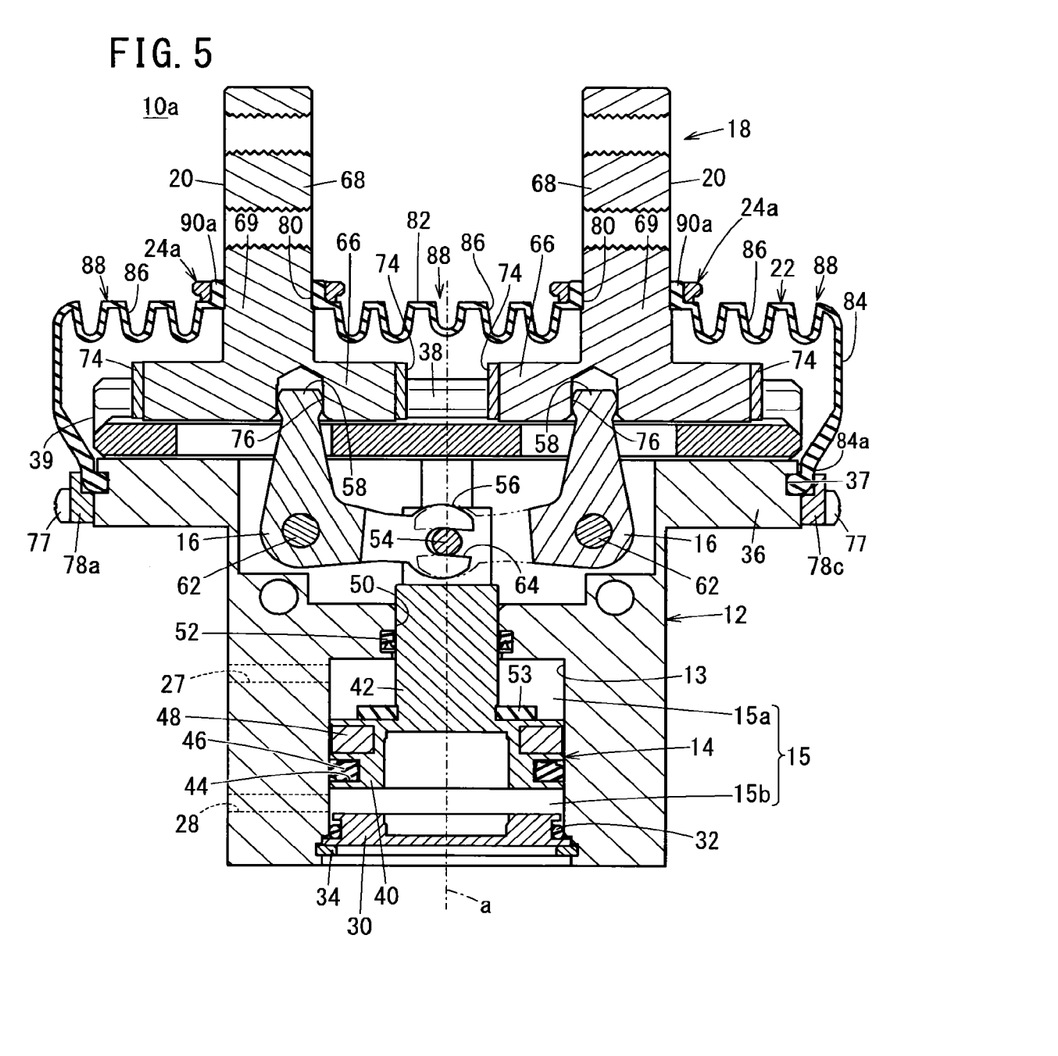
FIG. 5 is a cross-sectional view of the chuck apparatus shown in FIG. 4.

In the chuck apparatus 10*a* according to a modification shown in FIGS. 4 and 5, pressing members 24*a* are disposed on the outer side of the cover member 22. In this case, in the cover member 22, seal members 90*a*, which surround the root parts 69 of the fingers 68, project from the main wall 82 toward a side opposite from the base portions 66. Further, the pressing members 24*a* are formed in annular shapes, are arranged so as to surround the seal members 90*a* at locations outside of the cover member 22, and press the seal members 90*a* against the fingers 68. Moreover, the seal members 90*a* are sandwiched in an elastically compressed state between the pressing members 24*a* and the fingers 68, and the pressing members 24*a* are in a state of being fitted tightly on the outer side of the seal members 90*a*. Thus, it is unlikely that the pressing members 24*a* will drop off from the cover member 22 and the fingers 68.

In accordance with the chuck apparatus 10*a* according to such a modification, when the pressing members 24*a* are assembled, the pressing members 24*a* can easily be mounted from the outer side of the cover member 22.

In the chuck apparatus 10, 10*a*, the pair of chuck members 20 may be supported on the body 12 so as to be capable of rotating about respective pivot points.

In the above-described chuck apparatus 10, 10*a*, only one of the pair of chuck members 20 may be movable with respect to the body 12, whereas the other chuck member 20 need not necessarily be movable with respect to the body 12. More specifically, the gripping section 18 may be configured to grip the workpiece by having only one of the chuck members 20 move with respect to the body 12.

In the chuck apparatus 10, 10*a*, as a power source for the drive mechanism that causes the chuck members 20 to move, instead of a fluid pressure cylinder (the piston 14 and the cylinder section 35), an actuator (i.e., an electric motor or the like) driven by electrical energy may be adopted.

Apart therefrom, the chuck apparatus according to the present invention is not limited to the embodiment described above, and various configurations could be adopted therein without deviating from the scope of the present invention as defined by the appended claims.

What is claimed is:

1. A chuck apparatus comprising a body and a gripping section configured to be opened and closed, the gripping section including a pair of chuck members supported on the body, wherein at least one of the chuck members is movable with respect to the body, and a workpiece is gripped by the gripping section, wherein the chuck apparatus further comprises:
 a cover member including an insertion hole therein through which a finger of the one of the chuck members is inserted, and a seal member configured to surround the insertion hole and abut against the finger, wherein the cover member is attached to the body so as to cover base portions of the chuck members, and is elastically deformable so as to follow displacement of the one of the chuck members; and
 a pressing member configured to press the seal member against the finger, the seal member being press-fitted between the finger and the pressing member, wherein
 the pressing member includes a plurality of pressing sections arranged alongside one another in a circumferential direction; and
 the seal member is fitted between the plurality of pressing sections and the finger.

2. The chuck apparatus according to claim 1, wherein:
 the pressing member is formed in an annular shape surrounding the finger; and
 the seal member is sandwiched in an elastically compressed state between the pressing member and the finger.

3. The chuck apparatus according to claim 1, wherein the pressing member is disposed on an outer side of the cover member.

4. The chuck apparatus according to claim 1, wherein:
 of the pair of chuck members, another chuck member also is movable with respect to the body;
 the cover member further includes another insertion hole and another seal member formed corresponding to the other chuck member; and
 another pressing member is further provided corresponding to the other chuck member.

5. The chuck apparatus according to claim 1, wherein the pressing member is configured to place an inner circumferential surface of the seal member in abutment against an outer circumferential surface of the finger.

6. A chuck apparatus comprising a body and a gripping section configured to be opened and closed, the gripping section including a pair of chuck members supported on the body, wherein at least one of the chuck members is movable with respect to the body, and a workpiece is gripped by the gripping section, wherein the chuck apparatus further comprises:
 a cover member including an insertion hole therein through which a finger of the one of the chuck members is inserted, and a seal member configured to surround the insertion hole and abut against the finger, wherein the cover member is attached to the body so as to cover base portions of the chuck members, and is elastically deformable so as to follow displacement of the one of the chuck members; and
 a pressing member configured to press the seal member against the finger, the seal member being press-fitted between the finger and the pressing member,
 wherein the pressing member is disposed on an inner side of the cover member.

* * * * *